(12) United States Patent
Wang et al.

(10) Patent No.: US 12,129,524 B2
(45) Date of Patent: Oct. 29, 2024

(54) CHROME-FREE TANNING PROCESS OF ECOLOGICAL LEATHER

(71) Applicant: SICHUAN UNIVERSITY, Chengdu (CN)

(72) Inventors: Yanan Wang, Chengdu (CN); Yue Yu, Chengdu (CN); Bi Shi, Chengdu (CN); Jianfei Zhou, Chengdu (CN); Yunhang Zeng, Chengdu (CN); Wenhua Zhang, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 18/681,096

(22) PCT Filed: May 11, 2022

(86) PCT No.: PCT/CN2022/092095
§ 371 (c)(1),
(2) Date: Feb. 5, 2024

(87) PCT Pub. No.: WO2023/159773
PCT Pub. Date: Aug. 31, 2023

(65) Prior Publication Data
US 2024/0263257 A1    Aug. 8, 2024

(30) Foreign Application Priority Data
Feb. 24, 2022 (CN) .......................... 202210171515.2

(51) Int. Cl.
C14C 3/24 (2006.01)
C14C 3/04 (2006.01)
C14C 3/16 (2006.01)
C14C 3/28 (2006.01)

(52) U.S. Cl.
CPC .................. *C14C 3/24* (2013.01); *C14C 3/04* (2013.01); *C14C 3/16* (2013.01); *C14C 3/28* (2013.01)

(58) Field of Classification Search
CPC .... C14C 3/24; C14C 3/04; C14C 3/16; C14C 3/28
See application file for complete search history.

(56) References Cited

FOREIGN PATENT DOCUMENTS

| CN | 103060488 A | 4/2013 | | |
|---|---|---|---|---|
| CN | 103060488 B | 4/2014 | | |
| CN | 107119154 | * | 9/2017 | ............... C14C 3/08 |
| CN | 107502687 A | 12/2017 | | |
| CN | 108690887 A | 10/2018 | | |
| CN | 110628968 | * | 12/2019 | ............... C14C 1/06 |
| CN | 110628968 A | 12/2019 | | |
| CN | 112941248 A | 6/2021 | | |
| CN | 110628968 B | 9/2021 | | |
| CN | 114410853 A | 4/2022 | | |
| CN | 114410855 A | 4/2022 | | |
| EP | 3453728 A1 | 3/2019 | | |
| GB | 156186 A | * | 1/1921 | |

OTHER PUBLICATIONS

Zhicheng et al. Advanced MAsking Agent for Leather Tanning from Stepwise Degredation and Oxidation of Cellulose. Green Chemistry, May 2021.*
Wang et al. Tanning Performance of a Novel CHrome-Free Complex TAnning Agent: Penetration and Distribution. JALCA vol. 16, 2021, p. 277-283.*
Wang et al. Study on Tanning Technology of Laccase Catalyzed Lignin Combined with Aluminum Sulfate. LEather Science and Engineering, vol. 30, ISsue 2, 2020.*
Zhen Wang, et al., Tanning Performance of a Novel Chrome-Free Complex Tanning Agent: Penetration and Distribution, JALCA, 2021, pp. 277-283, vol. 116.
1-2260/TS, Provincial periodical, Beijing Leather, 2022, pp. 24-27, ISSN: 1002-7947, Internal Institutions of China Leather Association.
Luo Jianxun, et al., Application of Novel Chrome-free Tanning Agent TWS on Cattle Hide, China Leather, 2014, pp. 1-5,10, vol. 43 No.3.
Yue Yu, et al., Preparation of highly-oxidized starch using hydrogen peroxide and its application as a novel ligand for zirconium tanning of leather, Carbohydrate Polymers, 2017, pp. 823-829, vol. 174.

* cited by examiner

*Primary Examiner* — Amina S Khan
(74) *Attorney, Agent, or Firm* — Bayramoglu Law Offices LLC

(57) ABSTRACT

A chrome-free tanning process of an ecological leather is characterized by a TWS+sodium lignosulfonate+TWLZ ternary tanning process system. The sodium lignosulfonate added can not only have a fixation effect on a TWS tanning agent to make the TWS tanning not undergo detanning at a low pH, but also significantly improve the uniformity of distribution of a TWLZ tanning agent in a hide/skin and promote the formation of a stable cross-linked network structure by the TWLZ tanning agent in a collagen fiber, which effectively overcomes the defects of tanning performance of the existing tanning systems to obtain a leather with uniform and sufficient tanning, a high isoelectric point, a strong electropositivity, excellent absorption for post-tanning chemicals, and a prominent softness, and gives a leather a wide use range and a high quality.

15 Claims, No Drawings

CHROME-FREE TANNING PROCESS OF ECOLOGICAL LEATHER

CROSS REFERENCE TO THE RELATED APPLICATIONS

This application is the national phase entry of International Application No. PCT/CN2022/092095, filed on May 11, 2022, which is based upon and claims priority to Chinese Patent Application No. 202210171515.2, filed on Feb. 24, 2022, the entire contents of which are incorporated herein by reference.

TECHNICAL FIELD

The present disclosure belongs to the technical field of leather processing, and in particular, relates to a chrome-free tanning process of an ecological leather.

BACKGROUND

Ecological leather manufacturing is the most important strategic objective of the global leather industry. Chrome tanning has become a dominant tanning method currently used in the leather industry because it can allow leather to have excellent hydrothermal stability and comprehensive performance. However, chrome tanning has potential environmental risks due to production of chrome-containing wastewater, solid wastes, etc. Therefore, it is scientifically and technologically desirable to develop a novel chrome-free tanning technique of an ecological leather to eliminate chrome pollution from the source so as to achieve sustainable development of the leather industry.

Chinese patent CN103060488B "Production Method of Eco-friendly Crust Lather" discloses a production method of an eco-friendly crust leather, where a wet white leather is tanned with a TWS organic tanning agent, then dyed and finished, and fixed with a chrome tanning agent. The obtained crust leather has excellent softness. However, the TWS organic tanning agent mainly reacts with amino of collagen. In this case, an isoelectric point of a tanned wet white leather does not exceed 5.0, resulting in that there are low binding rates of subsequent post-tanning chemicals (which are generally anionic materials at present). This not only causes a waste of post-tanning chemicals, but also increases an organic pollution load in post-tanning wastewater. Chinese patent CN110628968B "Chrome-Free Tanning Process of Sheep Leather, Wet White Sheep Skin, and Sheep Leather" discloses a method for tanning a wet white leather with a TWLZ chrome-free metal tanning agent. In this method, the TWLZ tanning agent is electropositive, and mainly coordinates with carboxyl of collagen. In this case, an isoelectric point of a wet white leather reaches 7.0 or more and thus the wet white leather exhibits excellent absorption and binding abilities to anionic post-tanning chemicals. However, TWLZ crust leather has a relatively-low softness, and is difficult to meet the requirements of the current leather products for softness, flexibility and light feeling. Due to the above disadvantages, the popularization and application of TWS and TWLZ chrome-free tanning techniques are limited to some extent.

In view of the above, the present disclosure is specifically proposed.

SUMMARY

In order to solve the problems in the background, the present disclosure is intended to provide a chrome-free tanning process of an ecological leather to prepare a leather that is fully and uniformly tanned and has a high isoelectric point and an excellent softness.

To allow the above objective, the present disclosure adopts the following technical solutions:

A chrome-free tanning process of an ecological leather is provided, including: tanning a pickled hide/skin as a raw material with a TWS tanning agent, adding sodium lignosulfonate to allow a reaction, and tanning a resulting product with a TWLZ tanning agent.

Preferably, based on a weight of the limed hide/skin, the TWS tanning agent is added at an amount of 1 wt % to 5 wt %, the sodium lignosulfonate is added at an amount of 1 wt % to 4 wt %, and the TWLZ tanning agent is added at an amount of 2 wt % to 6 wt %.

Preferably, the tanning with the TWS tanning agent includes: allowing a penetration of TWS tanning agent for 2 h to 4 h, adjusting a pH of a resulting system to 7.0 to 8.5, and allowing a binding at 35° C. to 42° C. for 1 h to 3 h.

Preferably, the tanning with the TWLZ tanning agent includes: allowing a penetration of TWLZ tanning agent for 1 h to 4 h at a pH of 3.0 to 4.5, adjusting the pH to 3.5 to 4.5, and allowing a binding at 35° C. to 42° C. for 1 h to 4 h.

Preferably, the sodium lignosulfonate is added to allow the reaction at room temperature for 0.5 h to 2 h.

Preferably, the pickled hide/skin includes, but is not limited to, any one of a pickled sheep skin, a pickled goat skin, and a pickled hide.

Preferably, the pH adjustment is conducted with a pH adjusting agent, and the pH adjusting agent includes, but is not limited to, any one or more of sodium bicarbonate, sodium carbonate, magnesium oxide, and an automatic pH adjusting agent.

The present disclosure also discloses an ecological leather prepared by the chrome-free tanning process described above.

Compared with the prior art, the present disclosure has the following beneficial effects:

(1) In the TWS+sodium lignosulfonate+TWLZ ternary chrome-free tanning system for an ecological leather constructed in the present disclosure, sodium lignosulfonate can not only assist in the fixation of a TWS tanning agent to make the TWS tanning not undergo detanning at a low pH, but also improve the uniformity of distribution of a TWLZ tanning agent in a hide/skin, which makes a tanning effect of the ternary tanning system significantly better than a tanning effect of the existing TWS, TWLZ, and TWS+TWLZ combination tanning systems.

(2) The ternary chrome-free tanning system for an ecological leather constructed in the present disclosure can lead to a leather with uniform and sufficient tanning, a high isoelectric point, a strong electropositivity, excellent absorption for post-tanning chemicals, and a prominent softness, and gives a leather a wide use range and a high quality, which is difficult to allow in the prior art.

DETAILED DESCRIPTION OF THE EMBODIMENTS

To make the objectives, technical solutions, and advantages of the present disclosure clear, the present disclosure is further described in detail below with reference to specific implementations. It should be understood that the description is exemplary and is not intended to limit the scope of the present disclosure. In addition, in the following description, descriptions of conventional structures and technologies are omitted to avoid unnecessarily confusing the concepts of the present disclosure. If no specific conditions are specified in the embodiments, the embodiments will be implemented under conventional conditions or the conditions recommended by a manufacturer. All of the used reagents or instruments which are not specified with manufacturers are conventional commercially-available products.

In an embodiment of the present disclosure, a chrome-free tanning process of an ecological leather is provided, including: a pickled hide/skin as a raw material is tanned with a TWS chrome-free organic tanning agent, sodium lignosulfonate is added to allow a reaction, and a resulting product is tanned with a TWLZ chrome-free metal tanning agent.

In the prior art, it is difficult to prepare a leather with uniform and sufficient tanning, a high isoelectric point, and a prominent softness through a simple combination of a TWS tanning agent and a TWLZ tanning agent, and this is because TWLZ has a high acidity. A tanning solution with TWLZ dissolved usually has a pH of less than 3.0, and under such a low pH, TWS tanning will undergo significant detanning, such that dispersion and fixation effects of the TWS tanning agent on fibers are weakened and the TWLZ tanning agent is difficult to evenly penetrate into a hide, which ultimately leads to a low shrinkage temperature and a poor softness of a resultant leather. The applicants have accidentally found in an experiment that the addition of sodium lignosulfonate after TWS tanning is completed can not only inhibit the detanning of TWS tanning, but also promote the uniform distribution of a TWLZ tanning agent in a hide/skin. A reaction mechanism of the above phenomenon is as follows: A molecular structure of sodium lignosulfonate includes active functional groups such as phenolic hydroxyl and sulfonic groups, where the phenolic hydroxyl can produce multi-point hydrogen binding with a TWS tanning agent and collagen, and the hydrophobicity of a benzene ring also provides a fixation effect for a TWS tanning agent. As a result, TWS and TWLZ combination tanning system generates a synergistic effect, TWS tanning will not undergo detanning at a low pH, collagen fibers are always in a dispersed state, and the TWLZ tanning agent can evenly penetrate into a hide/skin through fiber pores, which improves the uniformity of distribution of the TWLZ tanning agent in the hide/skin. In addition, the TWLZ tanning agent can undergo a coordination combination with sulfonic group in the sodium lignosulfonate to form a stable cross-linked network structure in a collagen fiber, such that a leather product with a high shrinkage temperature and an excellent softness is finally obtained.

It should be noted that the pickled hide/skin is obtained in accordance with a conventional process in the prior art, and in some preferred embodiments, the pickled hide/skin includes, but is not limited to, any one of a pickled sheep skin, a pickled goat skin, and a pickled hide.

In some preferred embodiments, based on a weight of the limed hide/skin, the TWS chrome-free organic tanning agent is added at an amount of 1 wt % to 5 wt %, the sodium lignosulfonate is added at an amount of 1 wt % to 4 wt %, and the TWLZ chrome-free metal tanning agent is added at an amount of 2 wt % to 6 wt %. It should be noted that the amounts of the above three ingredients are conventional amounts in the prior art, and are not distinguishing technical features of the present disclosure.

The tanning with the TWS chrome-free organic tanning agent is as follows: the pickled hide/skin is impregnated with the TWS chrome-free organic tanning liquor for 2 h to 4 h, a pH of a resulting system is adjusted to 7.0 to 8.5, and a binding is allowed at 35° C. to 42° C. for 1 h to 3 h. For example, in some specific embodiments, the pickled hide/skin obtained in accordance with a conventional process is placed in a rotary drum, a pickling solution is added at an amount of 30 wt % to 100 wt % and the TWS chrome-free organic tanning agent is added at an amount of 1 wt % to 5 wt % based on the weight of the limed hide/skin to the rotary drum, and the rotary drum is rotated for 2 h to 4 h to obtain a first system; then a pH of the first system is adjusted to 7.0 to 8.5, hot water is added at an amount of 100 wt % to 200 wt % based on the weight of the limed hide/skin, and the rotary drum is rotated for 1 h to 3 h with a temperature of a bath kept at 35° C. to 42° C. to obtain a second system; and the rotation is stopped, the second system is allowed to stand overnight and then rotated for 0.5 h the next day, and a resulting liquid is discharged.

The tanning with the TWLZ chrome-free metal tanning agent is as follows: the pickled hide/skin is impregnated with the TWLZ chrome-free metal tanning liquor for 1 h to 4 h at a pH of 3.0 to 4.5, a pH of a resulting system is adjusted to 3.5 to 4.5, and a binding is allowed at 35° C. to 42° C. for 1 h to 4 h. For example, in some specific embodiments, a pH of the bath is adjusted to 3.0 to 4.5, the TWLZ chrome-free metal tanning agent is added at an amount of 2 wt % to 6 wt % based on the weight of the limed hide/skin, and the rotary drum is further rotated for 1 h to 4 h to obtain a third system; a pH of the third system is adjusted with a pH adjusting agent to 3.5 to 4.5, then hot water is added at an amount of 100 wt % to 200 wt % based on the weight of the limed hide/skin, and the rotary drum is further rotated for 1 h to 4 h with a temperature of the bath kept at 35° C. to 42° C. to obtain a fourth system; and the rotation is stopped, the fourth system is allowed to stand overnight and then rotated for 0.5 h the next day, and a tanned leather is taken out.

In some preferred embodiments, a specific method of adding the sodium lignosulfonate to allow the reaction is as follows: room-temperature water is added at an amount of 30 wt % to 100 wt % and the sodium lignosulfonate is added at an amount of 1 wt % to 4 wt % based on the weight of the limed hide/skin to a mixture obtained after the tanning with the TWS chrome-free organic tanning agent, and then the rotary drum is rotated for 0.5 h to 2 h.

The pH adjustment is conducted with a pH adjusting agent. In some preferred embodiments, the pH adjusting agent includes, but is not limited to, any one or more of sodium bicarbonate, sodium carbonate, magnesium oxide, and an automatic pH adjusting agent.

In order to well understand the technical solutions provided by the present disclosure, the chrome-free tanning process of an ecological leather provided by applying the above embodiments of the present disclosure and performance tests each are illustrated below through a plurality of specific examples.

In the following examples and comparative examples, a method for determining a uniformity degree of distribution of a TWLZ tanning agent in a leather is as follows:

a tanned wet white leather is evenly split into a grain layer, an intermediate layer, and a flesh layer by a freezing microtome and then oven-dried at 102±2° C. to a constant weight; then a specified mass of an absolutely-dry sample is weighed and added to a digestion tube, nitric acid and hydrogen peroxide are added to the digestion tube, and digestion is conducted by a microwave digestion instrument; and a resulting system is diluted, and then an inductively coupled plasma-optical emission spectrometer is used to determine a metal ion content in each sample. A formula for calculating a uniformity degree of distribution of a TWLZ tanning agent in a wet white leather is as follows:

Uniformity degree of distribution of $TWLZ$ (%) =

$$\frac{2 \times \text{metal ion content in an intermediate layer}}{\text{Metal ion content in a grain layer} + \text{metal ion content in a flesh layer}} \times 100\%.$$

In the following examples and comparative examples, a method for determining an isoelectric point of a tanned wet white leather is as follows:
  a leather sample is dried in an oven at 45° C. and then crushed into a hide powder of about 2 mm by a grinding machine; 10 g of the powder sample and 400 mL of water are taken and added to a 500 mL Erlenmeyer flask to prepare a suspension, a pH of the suspension is adjusted with 0.1 mol/L HCl/NaOH, and then the Erlenmeyer flask is placed in a water bath shaker at 30° C., shaken at a rotational speed of 150 r/min for 30 min, and then taken out; and a Zeta potential of each sample is determined by a zeta potential testing instrument, and a change curve of a Zeta potential over time is plotted, where a pH of the suspension when a Zeta potential is zero is an isoelectric point of the tanned wet white leather.

In the following examples and comparative examples, a method for determining a shrinkage temperature of a tanned wet white leather is as follows:
  the shrinkage temperature of the tanned wet white leather is determined by a shrinkage temperature meter.

In the following examples and comparative examples, a method for determining a softness of a crust leather is as follows:
  a tanned wet white leather is processed according to a conventional post-tanning process to obtain the crust leather, and the softness of the crust leather is determined by a softness meter.

Information of some materials used in the specific examples of the present disclosure can be as follows:
  a TWS chrome-free organic tanning agent: Sichuan Tingjiang New Materials, Inc.;
  a TWLZ chrome-free metal tanning agent: Sichuan Tingjiang New Materials, Inc.;
  sodium lignosulfonate: Gaotang Huadong Lignin Co., Ltd.; and
  automatic pH adjusting agents: MGO produced by Stahl Coatings and Fine Chemicals (Suzhou) Co., Ltd., MO produced by Sichuan Decision New Material Technology Co., Ltd., and TJ-A511 produced by Sichuan Tingjiang New Materials, Inc.

Example 1

A pickled hide obtained according to a conventional process was placed in a rotary drum, a pickling solution was added at an amount of 60 wt % and a TWS chrome-free organic tanning agent was added at an amount of 5 wt % based on a weight of the limed hide to the rotary drum, and the rotary drum was rotated for 3 h to obtain a first system; a pH of the first system was adjusted with sodium carbonate and sodium bicarbonate to 7.7, then hot water was added at an amount of 150 wt % based on the weight of the limed hide to the rotary drum, and the rotary drum was rotated for 2 h with a temperature of a bath kept at 42° C. to obtain a second system; the rotation was stopped, the second system was allowed to stand overnight and then rotated for 0.5 h the next day, and a resulting liquid was discharged; room-temperature water was added at an amount of 30 wt % and sodium lignosulfonate was added at an amount of 2.5 wt % based on the weight of the limed hide to the rotary drum, and the rotary drum was rotated for 1.2 h to obtain a third system; a pH of the bath was adjusted with formic acid to 3.8, a TWLZ chrome-free metal tanning agent was added at an amount of 4 wt % based on the weight of the limed hide to the rotary drum, and the rotary drum was further rotated for 4 h to obtain a fourth system; a pH of the fourth system was adjusted with an automatic pH adjusting agent of MGO to 4.0, hot water was added at an amount of 200 wt % based on the weight of the limed hide to the rotary drum, and the rotary drum was rotated for 4 h with a temperature of the bath kept at 38° C. to obtain a fifth system; and the rotation was stopped, the fifth system was allowed to stand overnight and then rotated for 0.5 h the next day, and a resulting product was taken out to obtain an ecological chrome-free tanned wet white leather.

It was tested that a uniformity degree of distribution of the TWLZ tanning agent in the wet white leather was 99.6%, an isoelectric point of the wet white leather was 6.9, a shrinkage temperature of the wet white leather was 92.6° C., and a softness of a crust leather obtained after post-tanning was 7.7 mm. The test results were shown in Table 1.

Comparative Example 1

This comparative example was different from Example 1 in that, in Comparative Example 1, only 5 wt % of the TWS tanning agent was adopted for tanning, and the sodium lignosulfonate and the TWLZ tanning agent were not adopted for tanning. Detailed process steps were as follows:
  A pickled hide obtained according to a conventional process was placed in a rotary drum, a pickling solution was added at an amount of 60 wt % and a TWS chrome-free organic tanning agent was added at an amount of 5 wt % based on a weight of the limed hide to the rotary drum, and the rotary drum was rotated for 3 h to obtain a first system; then a pH of the first system was adjusted with sodium carbonate and sodium bicarbonate to 7.7, hot water was added at an amount of 150 wt % based on the weight of the limed hide, and the rotary drum was rotated for 2 h with a temperature of a bath kept at 42° C. to obtain a second system; and the rotation was stopped, the second system was allowed to stand overnight and then rotated for 0.5 h the next day, and a resulting product was taken out to obtain a tanned wet white leather.

It was tested that an isoelectric point of the wet white leather was 4.9, a shrinkage temperature of the wet white leather was 84.5° C., and a softness of a crust leather obtained after post-tanning was 7.0 mm. The test results were shown in Table 1.

Comparative Example 2

This comparative example was different from Example 1 in that, in Comparative Example 2, 9 wt % of the TWS tanning agent was adopted for tanning, and the sodium lignosulfonate and the TWLZ tanning agent were not adopted for tanning. Detailed process steps were as follows:
  A pickled hide obtained according to a conventional process was placed in a rotary drum, a pickling solution was added at an amount of 60 wt % and a TWS chrome-free organic tanning agent was added at an amount of 9 wt % based on a weight of the limed hide to the rotary drum, and the rotary drum was rotated for 3 h to obtain a first system; then a pH of the first system was adjusted with sodium carbonate and sodium bicarbonate to 7.7, hot water was added at an amount of 150 wt % based on the weight of the limed hide, and the rotary drum was rotated for 2 h with a temperature of a bath kept at 42° C. to obtain a second system; and the rotation was stopped, the second system was allowed to stand overnight and then rotated for 0.5 h the next day, and a resulting product was taken out to obtain a tanned wet white leather.

It was tested that an isoelectric point of the wet white leather was 5.0, a shrinkage temperature of the wet white leather was 85.6° C., and a softness of a crust leather obtained after post-tanning was 7.1 mm. The test results were shown in Table 1.

Comparative Example 3

This comparative example was different from Example 1 in that, in Comparative Example 3, only 4 wt % of the TWLZ tanning agent was adopted for tanning, and the TWS tanning agent and the sodium lignosulfonate were not adopted for tanning. Detailed process steps were as follows:

A pickled hide obtained according to a conventional process was placed in a rotary drum, a pickling solution was added at an amount of 60 wt % and a TWLZ chrome-free metal tanning agent was added at an amount of 4 wt % based on a weight of the limed hide to the rotary drum, and the rotary drum was rotated for 4 h to obtain a first system; then a pH of the first system was adjusted with an automatic pH adjusting agent of MGO to 4.0, hot water was added at an amount of 200 wt % based on the weight of the limed hide, and the rotary drum was rotated for 4 h with a temperature of a bath kept at 38° C. to obtain a second system; and the rotation was stopped, the second system was allowed to stand overnight and then rotated for 0.5 h the next day, and a resulting product was taken out to obtain a tanned wet white leather.

It was tested that a uniformity degree of distribution of the TWLZ tanning agent in the wet white leather was 92.7%, an isoelectric point of the wet white leather was 7.2, a shrinkage temperature of the wet white leather was 69.2° C., and a softness of a crust leather obtained afterpost-tanning was 5.4 mm. The test results were shown in Table 1.

Comparative Example 4

This comparative example was different from Example 1 in that, in Comparative Example 4, 9 wt % of the TWLZ tanning agent was adopted for tanning, and the TWS tanning agent and the sodium lignosulfonate were not adopted for tanning. Detailed process steps were as follows:

A pickled hide obtained according to a conventional process was placed in a rotary drum, a pickling solution was added at an amount of 60 wt % and a TWLZ chrome-free metal tanning agent was added at an amount of 9 wt % based on a weight of the limed hide to the rotary drum, and the rotary drum was rotated for 4 h to obtain a first system; then a pH of the first system was adjusted with an automatic pH adjusting agent of MGO to 4.0, hot water was added at an amount of 200 wt % based on the weight of the limed hide, and the rotary drum was rotated for 4 h with a temperature of a bath kept at 38° C. to obtain a second system; and the rotation was stopped, the second system was allowed to stand overnight and then rotated for 0.5 h the next day, and a resulting product was taken out to obtain a tanned wet white leather.

It was tested that a uniformity degree of distribution of the TWLZ tanning agent in the wet white leather was 93.2%, an isoelectric point of the wet white leather was 7.4, a shrinkage temperature of the wet white leather was 79.6° C., and a softness of a crust leather obtained after post-tanning was 5.8 mm. The test results were shown in Table 1.

Comparative Example 5

This comparative example was different from Example 1 in that, in Comparative Example 5, although a combination of TWS and TWLZ was adopted for tanning, the sodium lignosulfonate was not adopted for tanning. Detailed process steps were as follows:

A pickled hide obtained according to a conventional process was placed in a rotary drum, a pickling solution was added at an amount of 60 wt % and a TWS chrome-free organic tanning agent was added at an amount of 5 wt % based on a weight of the limed hide to the rotary drum, and the rotary drum was rotated for 3 h to obtain a first system; a pH of the first system was adjusted with sodium carbonate and sodium bicarbonate to 7.7, then hot water was added at an amount of 150 wt % based on the weight of the limed hide to the rotary drum, and the rotary drum was rotated for 2 h with a temperature of a bath kept at 42° C. to obtain a second system; the rotation was stopped, the second system was allowed to stand overnight and then rotated for 0.5 h the next day, and a resulting liquid was discharged; room-temperature water was added at an amount of 30 wt % based on the weight of the limed hide to the rotary drum to obtain a third system; a pH of the bath was adjusted with formic acid to 3.8, a TWLZ chrome-free metal tanning agent was added at an amount of 4 wt % based on the weight of the limed hide to the rotary drum, and the rotary drum was further rotated for 4 h to obtain a fourth system; a pH of the fourth system was adjusted with an automatic pH adjusting agent of MGO to 4.0, hot water was added at an amount of 200 wt % based on the weight of the limed hide to the rotary drum, and the rotary drum was rotated for 4 h with a temperature of the bath kept at 38° C. to obtain a fifth system; and the rotation was stopped, the fifth system was allowed to stand overnight and then rotated for 0.5 h the next day, and a resulting product was taken out to obtain a tanned wet white leather.

It was tested that a uniformity degree of distribution of the TWLZ tanning agent in the wet white leather was 93.5%, an isoelectric point of the wet white leather was 6.7, a shrinkage temperature of the wet white leather was 83.8° C., and a softness of a crust leather obtained after post-tanning was 6.2 mm. The test results were shown in Table 1.

According to test results of Example 1 and Comparative Examples 1 to 5: In Comparative Example 1, when tanning is conducted with 4 wt % of a TWS tanning agent, a resulting wet white leather has an isoelectric point of only 4.9 and a shrinkage temperature of 84.5° C., and a resulting crust leather has a softness of 7.0 mm. In Comparative Example 2, when tanning is conducted with 9 wt % of a TWS tanning agent, a resulting wet white leather has an isoelectric point of only 5.0 and a shrinkage temperature of 85.6° C., and a resulting crust leather has a softness of 7.1 mm. In Comparative Example 3, when tanning is conducted with 5 wt % of a TWLZ tanning agent, a uniformity degree of distribution of TWLZ is 92.7%, a resulting wet white leather has an isoelectric point of 7.2 and a shrinkage temperature of only 69.2° C., and a resulting crust leather has a softness as low as 5.4 mm. In Comparative Example 4, when tanning is conducted with 9 wt % of a TWLZ tanning agent, a uniformity degree of distribution of TWLZ is 93.2%, a resulting wet white leather has an isoelectric point of 7.4 and a shrinkage temperature of only 79.6° C., and a resulting crust leather has a softness as low as 5.8 mm. In Comparative Example 5, when tanning is conducted with a combination of 4 wt % of TWS and 5 wt % of TWLZ, a uniformity degree of distribution of TWLZ is 93.5%, a resulting wet white leather has an isoelectric point of 6.7 and a shrinkage temperature of 83.8° C., and a resulting crust leather has a softness of 6.2 mm. In Example 1, when tanning is conducted with a combination of 4 wt % of TWS, sodium lignosulfonate, and 5 wt % of TWLZ, a uniformity degree of distribution of TWLZ is 99.6%, a resulting wet white leather has an isoelectric point of 6.9 and a shrinkage temperature of 92.6° C., and a resulting crust leather has a softness of 7.7 mm.

According to results of the above example and comparative examples: The tanning with TWS alone leads to a low isoelectric point, but allows an excellent softness. The tanning with TWLZ alone allows a high isoelectric point, but leads to a poor softness. Although the tanning with a simple combination of TWS and TWLZ allows a tanned leather to have a high isoelectric point, due to significant detanning of TWS tanning at a low pH, dispersion and fixation effects of the TWS tanning agent on fibers are weakened, and it is difficult to improve a uniformity degree of distribution of TWLZ, which ultimately results in a low shrinkage temperature of a tanned leather and a low softness of a crust leather. When the tanning is conducted with a combination of TWS, sodium lignosulfonate, and TWLZ, sodium lignosulfonate has a fixation effect on a TWS tanning agent due to hydrophobicity of a benzene ring of sodium lignosulfonate and a multi-point hydrogen bonding structure formed by hydroxyl of sodium lignosulfonate, such that collagen fibers are in a dispersed state, a uniformity degree of distribution of TWLZ is significantly improved, a resulting wet white leather has both a high isoelectric point and a high shrinkage temperature, and a resulting crust leather has a softness even higher than a softness of a crust leather obtained through tanning with TWS alone. It should be noted that, only when sodium lignosulfonate is ingeniously introduced in a tanning process, tanning can have advantages of both a TWS tanning system and a TWLZ tanning system and lead to a leather product with a high isoelectric point and a prominent softness, and the simple combination of TWS and TWLZ is difficult to allow the technical effects of the present disclosure. Therefore, the TWS+sodium lignosulfonate+TWLZ ternary tanning process system used in the present disclosure has a significant progress compared with the prior art, can lead to a beneficial tanning effect, and can overcome the defects of tanning performance of the existing tanning systems.

Table 1 Test Results

TABLE 1

| | | Test results | | | | |
|---|---|---|---|---|---|---|
| | Example 1 | Comparative Example 1 | Comparative Example 2 | Comparative Example 3 | Comparative Example 4 | Comparative Example 5 |
| Uniformity degree of distribution of TWLZ (%) | 99.6 | Not Applicable | Not Applicable | 92.7 | 93.2 | 93.5 |
| Isoelectric point of a wet white leather | 6.9 | 4.9 | 5.0 | 7.2 | 7.4 | 6.7 |
| Shrinkage temperature of a wet white leather (° C.) | 92.6 | 84.5 | 85.6 | 69.2 | 79.6 | 83.8 |
| Softness of a crust leather (mm) | 7.7 | 7.0 | 7.1 | 5.4 | 5.8 | 6.2 |

Example 2

A pickled goatskin obtained according to a conventional process was placed in a rotary drum, a pickling solution was added at an amount of 100 wt % and a TWS chrome-free organic tanning agent was added at an amount of 3 wt % based on a weight of the limed goatskin to the rotary drum, and the rotary drum was rotated for 4 h to obtain a first system; a pH of the first system was adjusted with sodium carbonate and sodium bicarbonate to 8.5, then hot water was added at an amount of 200 wt % based on the weight of the limed goatskin to the rotary drum, and the rotary drum was rotated for 1 h with a temperature of a bath kept at 35° C. to obtain a second system; the rotation was stopped, the second system was allowed to stand overnight and then rotated for 0.5 h the next day, and a resulting liquid was discharged; room-temperature water was added at an amount of 60 wt % and sodium lignosulfonate was added at an amount of 1 wt % based on the weight of the limed goatskin to the rotary drum, and the rotary drum was rotated for 2 h to obtain a third system; a pH of the bath was adjusted with formic acid to 4.5, a TWLZ chrome-free metal tanning agent was added at an amount of 6 wt % based on the weight of the limed goatskin to the rotary drum, and the rotary drum was further rotated for 1 h to obtain a fourth system; a pH of the fourth system was adjusted with sodium bicarbonate to 4.5, hot water was added at an amount of 100 wt % based on the weight of the limed goatskin to the rotary drum, and the rotary drum was rotated for 1 h with a temperature of the bath kept at 42° C. to obtain a fifth system; and the rotation was stopped, the fifth system was allowed to stand overnight and then rotated for 0.5 h the next day, and a resulting product was taken out to obtain an ecological chrome-free tanned wet white leather.

It was tested that a uniformity degree of distribution of the TWLZ tanning agent in the wet white leather was 98.5%, an isoelectric point of the wet white leather was 7.5, a shrinkage temperature of the wet white leather was 96.9° C., and a softness of a crust leather obtained after post-tanning was 8.4 mm.

Example 3

A pickled sheepskin obtained according to a conventional process was placed in a rotary drum, a pickling solution was added at an amount of 30 wt % and a TWS chrome-free organic tanning agent was added at an amount of 1 wt % based on a weight of the limed sheepskin to the rotary drum, and the rotary drum was rotated for 2 h to obtain a first system; a pH of the first system was adjusted with sodium carbonate and sodium bicarbonate to 7.0, then hot water was added at an amount of 100 wt % based on the weight of the limed sheepskin to the rotary drum, and the rotary drum was rotated for 3 h with a temperature of a bath kept at 38° C. to obtain a second system; the rotation was stopped, the second system was allowed to stand overnight and then rotated for 0.5 h the next day, and a resulting liquid was discharged; room-temperature water was added at an amount of 100 wt % and sodium lignosulfonate was added at an amount of 4 wt % based on the weight of the limed sheepskin to the rotary drum, and the rotary drum was rotated for 0.5 h to obtain a third system; a pH of the bath was adjusted with formic acid to 3.0, a TWLZ chrome-free metal tanning agent was added at an amount of 2 wt % based on the weight of the limed sheepskin to the rotary drum, and the rotary drum was further rotated for 2.5 h to obtain a fourth system; a pH of the fourth system was adjusted with sodium carbonate to 3.5, hot water was added at an amount of 150 wt % based on the weight of the limed sheepskin to the rotary drum, and the rotary drum was rotated for 2.5 h with a temperature of the bath kept at 35° C. to obtain a fifth system; and the rotation was stopped, the fifth system was allowed to stand overnight and then rotated for 0.5 h the next day, and a resulting product was taken out to obtain an ecological chrome-free tanned wet white leather.

It was tested that a uniformity degree of distribution of the TWLZ tanning agent in the wet white leather was 98.8%, an isoelectric point of the wet white leather was 6.7, a shrinkage temperature of the wet white leather was 90.4° C., and a softness of a crust leather obtained after post-tanning was 7.8 mm.

Example 4

A pickled hide obtained according to a conventional process was placed in a rotary drum, a pickling solution was added at an amount of 30 wt % and a TWS chrome-free organic tanning agent was added at an amount of 1 wt % based on a weight of the limed hide to the rotary drum, and the rotary drum was rotated for 4 h to obtain a first system; a pH of the first system was adjusted with sodium carbonate and sodium bicarbonate to 8.5, then hot water was added at an amount of 100 wt % based on the weight of the limed hide to the rotary drum, and the rotary drum was rotated for 3 h with a temperature of a bath kept at 35° C. to obtain a second system; the rotation was stopped, the second system was allowed to stand overnight and then rotated for 0.5 h the next day, and a resulting liquid was discharged; room-temperature water was added at an amount of 60 wt % and sodium lignosulfonate was added at an amount of 4 wt % based on the weight of the limed hide to the rotary drum, and the rotary drum was rotated for 2 h to obtain a third system; a pH of the bath was adjusted with formic acid to 3.0, a TWLZ chrome-free metal tanning agent was added at an amount of 6 wt % based on the weight of the limed hide to the rotary drum, and the rotary drum was further rotated for 2.5 h to obtain a fourth system; a pH of the fourth system was adjusted with magnesium oxide to 3.5, hot water was added at an amount of 150 wt % based on the weight of the limed hide to the rotary drum, and the rotary drum was rotated for 1 h with a temperature of the bath kept at 35° C. to obtain a fifth system; and the rotation was stopped, the fifth system was allowed to stand overnight and then rotated for 0.5 h the next day, and a resulting product was taken out to obtain an ecological chrome-free tanned wet white leather.

It was tested that a uniformity degree of distribution of the TWLZ tanning agent in the wet white leather was 97.9%, an isoelectric point of the wet white leather was 7.4, a shrinkage temperature of the wet white leather was 91.3° C., and a softness of a crust leather obtained after post-tanning was 7.6 mm.

Example 5

A pickled sheepskin obtained according to a conventional process was placed in a rotary drum, a pickling solution was added at an amount of 60 wt % and a TWS chrome-free organic tanning agent was added at an amount of 3 wt % based on a weight of the limed sheepskin to the rotary drum, and the rotary drum was rotated for 3 h to obtain a first system; a pH of the first system was adjusted with sodium carbonate and sodium bicarbonate to 7.7, then hot water was added at an amount of 200 wt % based on the weight of the limed sheepskin to the rotary drum, and the rotary drum was rotated for 1 h with a temperature of a bath kept at 35° C. to obtain a second system; the rotation was stopped, the second system was allowed to stand overnight and then rotated for 0.5 h the next day, and a resulting liquid was discharged; room-temperature water was added at an amount of 30 wt % and sodium lignosulfonate was added at an amount of 1 wt % based on the weight of the limed sheepskin to the rotary drum, and the rotary drum was rotated for 1.2 h to obtain a third system; a pH of the bath was adjusted with formic acid to 4.5, a TWLZ chrome-free metal tanning agent was added at an amount of 4 wt % based on the weight of the limed sheepskin to the rotary drum, and the rotary drum was further rotated for 4 h to obtain a fourth system; a pH of the fourth system was adjusted with sodium bicarbonate and magnesium oxide to 4.5, hot water was added at an amount of 100 wt % based on the weight of the limed sheepskin to the rotary drum, and the rotary drum was rotated for 4 h with a temperature of the bath kept at 42° C. to obtain a fifth system; and the rotation was stopped, the fifth system was allowed to stand overnight and then rotated for 0.5 h the next day, and a resulting product was taken out to obtain an ecological chrome-free tanned wet white leather.

It was tested that a uniformity degree of distribution of the TWLZ tanning agent in the wet white leather was 99.1%, an isoelectric point of the wet white leather was 7.0, a shrinkage temperature of the wet white leather was 98.8° C., and a softness of a crust leather obtained after post-tanning was 8.7 mm.

Example 6

A pickled goatskin obtained according to a conventional process was placed in a rotary drum, a pickling solution was added at an amount of 100 wt % and a TWS chrome-free organic tanning agent was added at an amount of 5 wt % based on a weight of the limed goatskin to the rotary drum, and the rotary drum was rotated for 2 h to obtain a first system; a pH of the first system was adjusted with sodium carbonate and sodium bicarbonate to 7.0, then hot water was added at an amount of 150 wt % based on the weight of the limed goatskin to the rotary drum, and the rotary drum was rotated for 2 h with a temperature of a bath kept at 42° C. to obtain a second system; the rotation was stopped, the second system was allowed to stand overnight and then rotated for 0.5 h the next day, and a resulting liquid was discharged; room-temperature water was added at an amount of 100 wt % and sodium lignosulfonate was added at an amount of 2.5 wt % based on the weight of the limed goatskin to the rotary drum, and the rotary drum was rotated for 0.5 h to obtain a third system; a pH of the bath was adjusted with formic acid to 3.8, a TWLZ chrome-free metal tanning agent was added at an amount of 2 wt % based on the weight of the limed goatskin to the rotary drum, and the rotary drum was further rotated for 1 h to obtain a fourth system; a pH of the fourth system was adjusted with sodium carbonate and an automatic pH adjusting agent of MO to 4.0, hot water was added at an amount of 200 wt % based on the weight of the limed goatskin to the rotary drum, and the rotary drum was rotated for 2.5 h with a temperature of the bath kept at 38° C. to obtain a fifth system; and the rotation was stopped, the fifth system was allowed to stand overnight and then rotated for 0.5 h the next day, and a resulting product was taken out to obtain an ecological chrome-free tanned wet white leather.

It was tested that a uniformity degree of distribution of the TWLZ tanning agent in the wet white leather was 98.4%, an isoelectric point of the wet white leather was 6.6, a shrinkage temperature of the wet white leather was 95.4° C., and a softness of a crust leather obtained after post-tanning was 8.2 mm.

Example 7

A pickled hide obtained according to a conventional process was placed in a rotary drum, a pickling solution was added at an amount of 100 wt % and a TWS chrome-free organic tanning agent was added at an amount of 3 wt % based on a weight of the limed hide to the rotary drum, and the rotary drum was rotated for 2 h to obtain a first system; a pH of the first system was adjusted with sodium carbonate and sodium bicarbonate to 7.0, then hot water was added at an amount of 200 wt % based on the weight of the limed hide to the rotary drum, and the rotary drum was rotated for 1 h with a temperature of a bath kept at 38° C. to obtain a second system; the rotation was stopped, the second system was allowed to stand overnight and then rotated for 0.5 h the next day, and a resulting liquid was discharged; room-temperature water was added at an amount of 100 wt % and sodium lignosulfonate was added at an amount of 1 wt % based on the weight of the limed hide to the rotary drum, and the rotary drum was rotated for 0.5 h to obtain a third system; a pH of the bath was adjusted with formic acid to 4.5, a TWLZ chrome-free metal tanning agent was added at an amount of 2 wt % based on the weight of the limed hide to the rotary drum, and the rotary drum was further rotated for 1 h to obtain a fourth system; a pH of the fourth system was adjusted with sodium bicarbonate and an automatic pH adjusting agent of TJ-A511 to 4.5, hot water was added at an amount of 100 wt % based on the weight of the limed hide to the rotary drum, and the rotary drum was rotated for 2.5 h with a temperature of the bath kept at 42° C. to obtain a fifth system; and the rotation was stopped, the fifth system was allowed to stand overnight and then rotated for 0.5 h the next day, and a resulting product was taken out to obtain an ecological chrome-free tanned wet white leather.

It was tested that a uniformity degree of distribution of the TWLZ tanning agent in the wet white leather was 97.6%, an isoelectric point of the wet white leather was 6.5, a shrinkage temperature of the wet white leather was 90.8° C., and a softness of a crust leather obtained after post-tanning was 7.4 mm.

Example 8

A pickled sheepskin obtained according to a conventional process was placed in a rotary drum, a pickling solution was added at an amount of 30 wt % and a TWS chrome-free organic tanning agent was added at an amount of 5 wt % based on a weight of the limed sheepskin to the rotary drum, and the rotary drum was rotated for 4 h to obtain a first system; a pH of the first system was adjusted with sodium carbonate and sodium bicarbonate to 8.5, then hot water was added at an amount of 150 wt % based on the weight of the limed sheepskin to the rotary drum, and the rotary drum was rotated for 2 h with a temperature of a bath kept at 42° C. to obtain a second system; the rotation was stopped, the second system was allowed to stand overnight and then rotated for 0.5 h the next day, and a resulting liquid was discharged; room-temperature water was added at an amount of 60 wt % and sodium lignosulfonate was added at an amount of 2.5 wt % based on the weight of the limed sheepskin to the rotary drum, and the rotary drum was rotated for 2 h to obtain a third system; a pH of the bath was adjusted with formic acid to 3.8, a TWLZ chrome-free metal tanning agent was added at an amount of 6 wt % based on the weight of the limed sheepskin to the rotary drum, and the rotary drum was further rotated for 4 h to obtain a fourth system; a pH of the fourth system was adjusted with sodium bicarbonate and an automatic pH adjusting agent of TJ-A511 to 4.0, hot water was added at an amount of 200 wt % based on the weight of the limed sheepskin to the rotary drum, and the rotary drum was rotated for 1 h with a temperature of the bath kept at 38° C. to obtain a fifth system; and the rotation was stopped, the fifth system was allowed to stand overnight and then rotated for 0.5 h the next day, and a resulting product was taken out to obtain an ecological chrome-free tanned wet white leather.

It was tested that a uniformity degree of distribution of the TWLZ tanning agent in the wet white leather was 99.4%, an isoelectric point of the wet white leather was 7.5, a shrinkage temperature of the wet white leather was 100.2° C., and a softness of a crust leather obtained after post-tanning was 8.8 mm.

Example 9

A pickled goatskin obtained according to a conventional process was placed in a rotary drum, a pickling solution was added at an amount of 60 wt % and a TWS chrome-free organic tanning agent was added at an amount of 1 wt % based on a weight of the limed goatskin to the rotary drum, and the rotary drum was rotated for 3 h to obtain a first system; a pH of the first system was adjusted with sodium carbonate and sodium bicarbonate to 7.7, then hot water was added at an amount of 100 wt % based on the weight of the limed goatskin to the rotary drum, and the rotary drum was rotated for 3 h with a temperature of a bath kept at 38° C. to obtain a second system; the rotation was stopped, the second system was allowed to stand overnight and then rotated for 0.5 h the next day, and a resulting liquid was discharged; room-temperature water was added at an amount of 30 wt % and sodium lignosulfonate was added at an amount of 4 wt % based on the weight of the limed goatskin to the rotary drum, and the rotary drum was rotated for 1.2 h to obtain a third system; a pH of the bath was adjusted with formic acid to 3.0, a TWLZ chrome-free metal tanning agent was added at an amount of 4 wt % based on the weight of the limed goatskin to the rotary drum, and the rotary drum was further rotated for 2.5 h to obtain a fourth system; a pH of the fourth system was adjusted with sodium carbonate, sodium bicarbonate, and an automatic pH adjusting agent of MO to 3.5, hot water was added at an amount of 150 wt % based on the weight of the limed goatskin to the rotary drum, and the rotary drum was rotated for 4 h with a temperature of the bath kept at 35° C. to obtain a fifth system; and the rotation was stopped, the fifth system was allowed to stand overnight and then rotated for 0.5 h the next day, and a resulting product was taken out to obtain an ecological chrome-free tanned wet white leather.

It was tested that a uniformity degree of distribution of the TWLZ tanning agent in the wet white leather was 98.3%, an isoelectric point of the wet white leather was 7.0, a shrinkage temperature of the wet white leather was 94.1° C., and a softness of a crust leather obtained after post-tanning was 7.9 mm.

Example 10

A pickled hide obtained according to a conventional process was placed in a rotary drum, a pickling solution was added at an amount of 60 wt % and a TWS chrome-free organic tanning agent was added at an amount of 3 wt % based on a weight of the limed hide to the rotary drum, and the rotary drum was rotated for 3 h to obtain a first system; a pH of the first system was adjusted with sodium carbonate and sodium bicarbonate to 8.5, then hot water was added at an amount of 200 wt % based on the weight of the limed hide to the rotary drum, and the rotary drum was rotated for 3 h with a temperature of a bath kept at 42° C. to obtain a second system; the rotation was stopped, the second system was allowed to stand overnight and then rotated for 0.5 h the next day, and a resulting liquid was discharged; room-temperature water was added at an amount of 60 wt % and sodium lignosulfonate was added at an amount of 4 wt % based on the weight of the limed hide to the rotary drum, and the rotary drum was rotated for 2 h to obtain a third system; a pH of the bath was adjusted with formic acid to 3.0, a TWLZ chrome-free metal tanning agent was added at an amount of 6 wt % based on the weight of the limed hide to the rotary drum, and the rotary drum was further rotated for 2.5 h to obtain a fourth system; a pH of the fourth system was adjusted with an automatic pH adjusting agent of MGO to 4.5, hot water was added at an amount of 200 wt % based on the weight of the limed hide to the rotary drum, and the rotary drum was rotated for 2.5 h with a temperature of the bath kept at 42° C. to obtain a fifth system; and the rotation was stopped, the fifth system was allowed to stand overnight and then rotated for 0.5 h the next day, and a resulting product was taken out to obtain an ecological chrome-free tanned wet white leather.

It was tested that a uniformity degree of distribution of the TWLZ tanning agent in the wet white leather was 99.0%, an isoelectric point of the wet white leather was 7.3, a shrinkage temperature of the wet white leather was 93.7° C., and a softness of a crust leather obtained after post-tanning was 7.9 mm.

Finally, it should be noted that the above examples are merely intended to describe the technical solutions of the present disclosure, rather than to limit the present disclosure. Although the present disclosure is described in detail with reference to the above examples, persons of ordinary skill in the art should understand that modifications may be made to the technical solutions described in the above examples or equivalent replacements may be made to some or all technical features thereof, which do not make the essence of corresponding technical solutions depart from the scope of the technical solutions in the examples of the present disclosure.

What is claimed is:

1. A chrome-free tanning process of an ecological leather, comprising: tanning a pickled hide or skin as a raw material with a first tanning agent, adding sodium lignosulfonate to allow a reaction, and tanning a resulting product with a second tanning agent, wherein the first tanning agent has the structure of following Formula I:

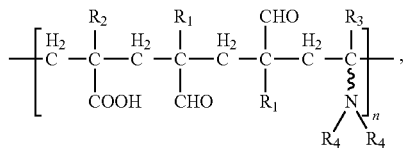

Formula I, wherein R1 is —CH$_3$, C$_2$H$_5$ or —C$_3$H$_7$; R2 is –H or CH$_3$; R3 is —H or CH$_3$; R4 is —CH$_3$ or —C$_2$H$_5$ and n is 9-13; and the second tanning agent has the structure of following Formula II:

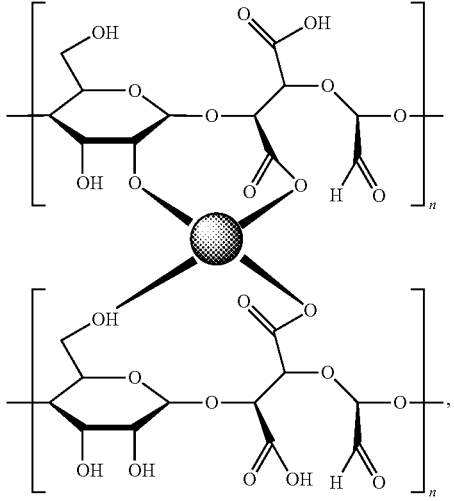

Formula II, wherein M is Al or Zr and n is 19-20.

2. The chrome-free tanning process of the ecological leather according to claim 1, wherein based on a weight of the pickled hide or skin, the first tanning agent is added at an amount of 1 wt % to 5 wt %, the sodium lignosulfonate is added at an amount of 1 wt % to 4 wt %, and the second tanning agent is added at an amount of 2 wt % to 6 wt %.

3. The chrome-free tanning process of the ecological leather according to claim 1, wherein the tanning with the first tanning agent comprises: allowing a penetration of first tanning agent for 2 h to 4 h, adjusting a pH of a resulting system to 7.0 to 8.5, and allowing a binding at 35° C. to 42° C. for 1 h to 3 h.

4. The chrome-free tanning process of the ecological leather according to claim 1, wherein the tanning with the second tanning agent comprises: allowing a penetration of second tanning agent for 1 h to 4 h at a pH of 3.0 to 4.5, adjusting a pH to 3.5 to 4.5, and allowing a binding at 35° C. to 42° C. for 1 h to 4 h.

5. The chrome-free tanning process of the ecological leather according to claim 1, wherein the sodium lignosulfonate is added to allow the reaction at room temperature for 0.5 h to 2 h.

6. The chrome-free tanning process of the ecological leather according to claim 1, wherein the pickled hide or skin comprises one of a pickled sheepskin or a pickled goatskin.

7. The chrome-free tanning process of the ecological leather according to claim 3, wherein the pH adjustment is conducted with a pH adjusting agent, and the pH adjusting agent comprises one or more of sodium bicarbonate, sodium carbonate, magnesium oxide, and pH adjusting agent.

8. The chrome-free tanning process of the ecological leather according to claim 4, wherein the pH adjustment is conducted with a pH adjusting agent, and the pH adjusting agent comprises one or more of sodium bicarbonate, sodium carbonate, magnesium oxide, and pH adjusting agent.

9. An ecological leather prepared by the chrome-free tanning process according to claim 1.

10. The ecological leather according to claim 9, wherein in the chrome-free tanning process, based on a weight of the pickled hide or skin, the first tanning agent is added at an amount of 1 wt % to 5 wt %, the sodium lignosulfonate is added at an amount of 1 wt % to 4 wt %, and the second tanning agent is added at an amount of 2 wt % to 6 wt %.

11. The ecological leather according to claim 9, wherein in the chrome-free tanning process, the tanning with the first tanning agent comprises: allowing a penetration of first tanning agent for 2 h to 4 h, adjusting a pH of a resulting system to 7.0 to 8.5, and allowing a binding at 35° C. to 42° C. for 1 h to 3 h.

12. The ecological leather according to claim 9, wherein in the chrome-free tanning process, the tanning with the second tanning agent comprises: allowing a penetration of second tanning agent for 1 h to 4 h at a pH of 3.0 to 4.5, adjusting a pH to 3.5 to 4.5, and allowing a binding at 35° C. to 42° C. for 1 h to 4 h.

13. The ecological leather according to claim 9, wherein in the chrome-free tanning process, the sodium lignosulfonate is added to allow the reaction at room temperature for 0.5 h to 2 h.

14. The ecological leather according to claim 9, wherein in the chrome-free tanning process, the pickled hide or skin comprises one of a pickled sheepskin or a pickled goatskin.

15. The ecological leather according to claim 11, wherein in the chrome-free tanning process, the pH adjustment is conducted with a pH adjusting agent, and the pH adjusting agent comprises one or more of sodium bicarbonate, sodium carbonate, magnesium oxide, and pH adjusting agent.

* * * * *